US009081096B2

(12) United States Patent
Li

(10) Patent No.: US 9,081,096 B2
(45) Date of Patent: Jul. 14, 2015

(54) APPARATUS, METHOD, AND COMPUTER PROGRAM FOR A RESOLUTION-ENHANCED PSEUDO-NOISE CODE TECHNIQUE

(75) Inventor: Steven X. Li, Ellicott City, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 125 days.

(21) Appl. No.: 13/601,293

(22) Filed: Aug. 31, 2012

(65) Prior Publication Data

US 2014/0063483 A1    Mar. 6, 2014

(51) Int. Cl.
| | |
|---|---|
| *G01C 3/08* | (2006.01) |
| *G01S 17/89* | (2006.01) |
| *G01S 17/10* | (2006.01) |
| *G01S 7/481* | (2006.01) |
| *G01S 7/484* | (2006.01) |

(52) U.S. Cl.
CPC .............. *G01S 17/89* (2013.01); *G01S 7/484* (2013.01); *G01S 7/4815* (2013.01); *G01S 17/10* (2013.01)

(58) Field of Classification Search
CPC ........ G01C 3/08; G01C 15/002; G01S 17/89; G01S 7/4817; G01S 17/42
USPC .......... 356/3.01, 4.01, 4.07, 5.01, 5.09, 9, 625
See application file for complete search history.

(56) References Cited

U.S. PATENT DOCUMENTS

| | | | | |
|---|---|---|---|---|
| 3,836,917 | A  * | 9/1974  | Mee .............................. | 396/549 |
| 7,152,984 | B1 * | 12/2006 | Hayes .......................... | 359/534 |
| 7,248,342 | B1 * | 7/2007  | Degnan ........................ | 356/5.01 |
| 7,542,685 | B2 * | 6/2009  | Bai et al. ..................... | 398/193 |
| 7,982,861 | B2 * | 7/2011  | Abshire et al. .............. | 356/5.11 |
| 2009/0055699 | A1 * | 2/2009 | Murata ......................... | 714/744 |
| 2009/0148171 | A1 * | 6/2009 | Chen et al. .................... | 398/208 |
| 2011/0043806 | A1 * | 2/2011 | Guetta et al. ................. | 356/432 |
| 2012/0038903 | A1 * | 2/2012 | Weimer et al. ............... | 356/4.07 |

* cited by examiner

*Primary Examiner* — Isam Alsomiri
*Assistant Examiner* — Samantha K Abraham

(57) ABSTRACT

An apparatus, method, and computer program for a resolution enhanced pseudo-noise coding technique for 3D imaging is provided. In one embodiment, a pattern generator may generate a plurality of unique patterns for a return to zero signal. A plurality of laser diodes may be configured such that each laser diode transmits the return to zero signal to an object. Each of the return to zero signal includes one unique pattern from the plurality of unique patterns to distinguish each of the transmitted return to zero signals from one another.

16 Claims, 5 Drawing Sheets

APPARATUS, METHOD, AND COMPUTER PROGRAM FOR A RESOLUTION-ENHANCED PSEUDO-NOISE CODE TECHNIQUE

ORIGIN OF INVENTION

The invention described herein was made by an employee of the United States Government and may be manufactured and used by or for the Government for governmental purposes without the payment of any royalties thereon or therefor.

FIELD

The present invention generally relates to a high resolution three-dimension (3D) imaging lidar system and, more particularly, to a high resolution 3D imaging lidar system using a resolution-enhanced pseudo-noise code technique.

BACKGROUND

Space research in Earth orbit, lunar, and interplanetary environments has resulted in an urgent demand for autonomous observing technologies in recent years. One technique for autonomous observation is based on active imaging sensors. Active 3D imaging systems are attractive for a wide range of applications, such as surface reconstruction, mapping, landing of probes, obstacle recognition and navigation for vehicles, rendezvous, and docking maneuvers.

Much effort has been made to develop a 3D imaging laser radar based on a time-of-flight (TOF) technique. In this technique, a very short laser pulse is sent out towards the object and the scattered light from the object is collected. The time delay between the start pulse and the returned pulse is measured to determine the object distance. With this technique, a high peak power laser is required. In many cases, a relatively complicated diode pump, such as a passively Q-switched solid-state laser, is used as a light source.

However, applications of space-based lidars that require compact size, light weight, and reliability are usually constrained by the laser source. To date, the smallest devices appropriate for such applications are diode lasers. Unfortunately, compact semiconductor lasers have peak power levels well below the requirements of lidar systems based on TOF techniques. Thus, a pseudo-noise (PN) coding technique for 3D imaging may be beneficial.

PN code may include a spectrum similar to a random sequence of bits but is deterministically generated. PN code modulation may be widely used in RF communications. It may typically be modulated in non-return-to-zero (NRZ) format, where the transmitted pulse width equals to the coding bit period. Timing measurement accuracy using PN code technique may be proportional to the transmitted pulse width divided by the measurement signal to noise ratio. Shorter transmitted pulses result higher measurement accuracy for the same transmitted average power. Traditionally, PN code using NRZ format modulates the signal at 50% duty cycle. PN code modulation using an advanced scheme with a lower duty cycle may substantially increase the measurement accuracy.

SUMMARY

Certain embodiments of the present invention may provide solutions to the problems and needs in the art that have not yet been fully identified, appreciated, or solved by current 3D imaging systems. For example, embodiments of the present invention utilize a return-to-zero (RZ) resolution-enhanced pseudo-noise code technique to improve the ranging resolution by an order of magnitude with the same transmitted optical power. The duty cycle of RZ format can be reduced by narrowing the transmitter pulse width. The sharp transmitted pulses substantially increase the system timing measurements and reducing the background noise.

In accordance with an embodiment of the present invention, an apparatus is provided. The apparatus includes an array of laser diodes, such that each laser diode can transmit a RZ signal to different locations on an object. The apparatus also includes a telescope that can receive each of the transmitted RZ signals. Each of the RZ signals includes a unique pattern to distinguish between itself and the other transmitted RZ signals.

In another embodiment of the present invention, a computer-implemented method is provided. The method includes transmitting a return to zero signal to different locations on an object. The method also includes receiving each of the transmitted return to zero signals. Each of the return to zero signals includes a unique pattern to distinguish between itself and the other transmitted return to zero signals.

In yet another embodiment of the present invention, an apparatus is provided. The apparatus includes a pattern generator configured to generate a plurality of unique patterns for a return to zero signal. The apparatus also includes a plurality of laser diodes. Each of laser diodes is configured to transmit the return to zero signal to an object. Each of the return to zero signals includes one unique pattern from the plurality of unique patterns to distinguish each of the transmitted return to zero signals from one another.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

In order to measure distance between a laser source and a target (moveable or non-movable), a laser pulse is transmitted to the target and is reflected and returned. The time for the laser pulse to be transmitted and returned allows determination of the distance between the source and the target. However, transmitting pulses in rapid succession may cause confusion in delineating the difference between one pulse and another. In other words, if a first pulse is transmitted to a target and a second pulse is transmitted shortly thereafter to the target, it may be hard to determine which pulse returned first, i.e., the first pulse or the second pulse.

One or more embodiments solve the above-mentioned issue of differentiating between pulses transmitted in rapid succession. For example, one or more embodiments of the present invention pertain to transmitting a plurality of PN coded RZ pulses, to an object and calculating the time elapsed between transmission and reception of the RZ pulses by matching the transmission and reception pulse patterns to determine the distance between the source and the object. RZ pulse width can be a few percent of the PN code bit period. This results in enhanced timing resolution and reduced background noise.

Figure 1:
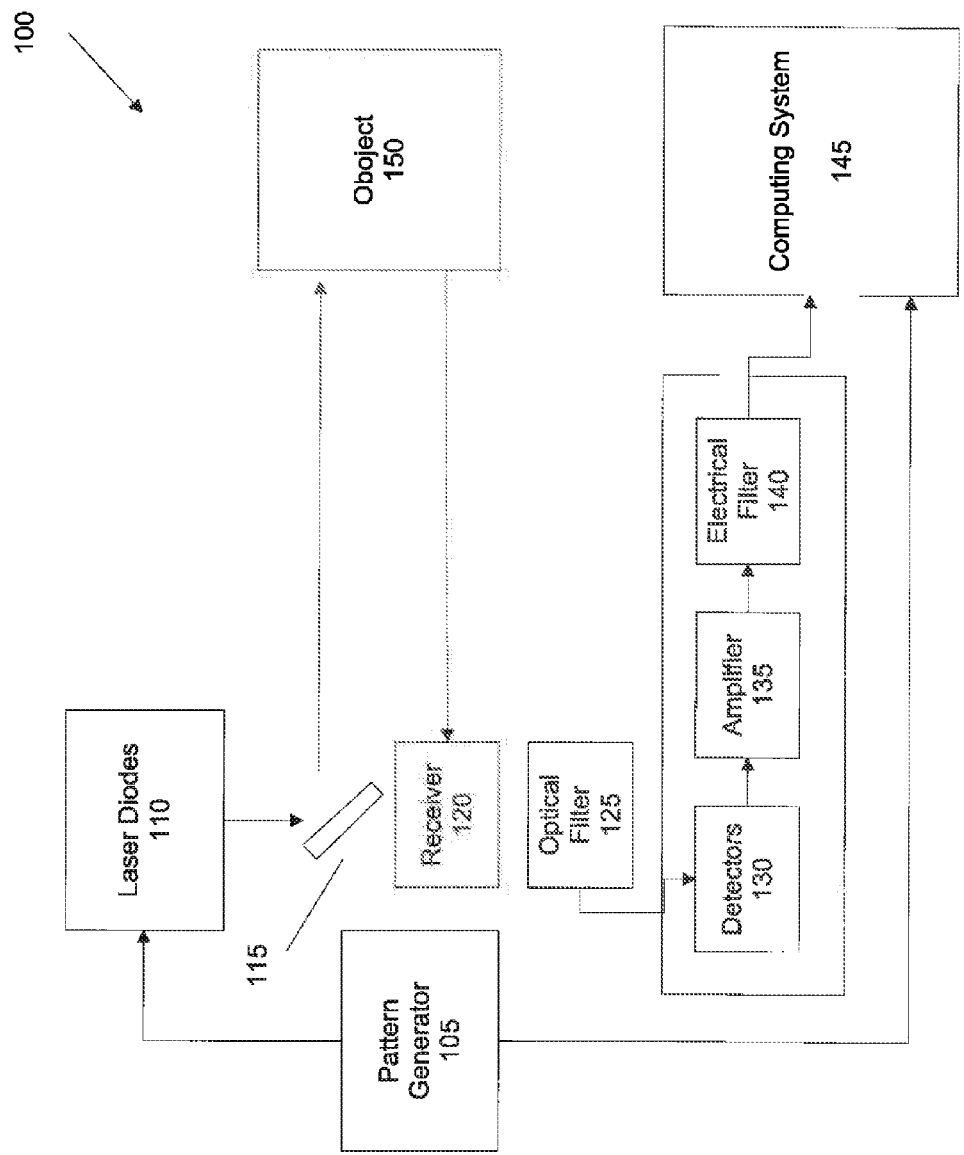
FIG. 1 illustrates a system for 3D imaging, according to an embodiment of the present invention.

FIG. 1 illustrates a system 100 for 3D imaging, according to an embodiment of the present invention. In this embodiment, a pattern generator 105 is configured to generate different patterns for each RZ pulse sequence, and drive an array of laser diodes 110, such that each laser diode 110 is configured to transmit RZ pulse sequence with a unique pattern to an object 150. It should be appreciated that object 150 may be a moveable object or a stationary object. Object 150 may also be a soft target, such as clouds, or a hard target, such as a vehicle, building, etc.

Because each RZ pulse sequence has a unique pattern, computing system 145 may easily distinguish between the plurality of RZ pulse sequences even when transmitted simultaneously. For example, bit error rate can be used for pattern searching algorithms.

In one embodiment, each laser diode may be configured to transmit a RZ pulse sequence having a unique pattern at different locations of object 150 simultaneously. For example, a first laser diode may transmit a RZ pulse sequence at a first location on object 150, a second laser diode may transmit a different RZ pulse sequence at a second location on object 150, and so on. By transmitting multiple unique RZ pulse sequences simultaneously to object 150, 3D imaging can be realized.

In another embodiment, each laser diode may transmit RZ pulse sequence, via a scanner or mirror 115, simultaneously to object 150. For example, scanner 115 scans and transmits RZ pulses to various locations on object 150. This configuration may also allow 3D imaging to be realized.

A receiver 120 may receive each reflected RZ pulse having its own unique pattern that bounced back from different locations on object 150. In this embodiment, receiver 120 may be a telescope. However, in other embodiments, depending on design choice, receiver 120 may be any device that is configured to receive the reflected pulses.

In order to reduce the optical domain or noise in each of the reflected sharper pulses, an optical filter 125 is utilized. This embodiment may include an array of photo detectors 130, such that each photo detector 130 can detect the respective reflected sharper pulse and its unique pattern. It should also be appreciated that a single photo detector may be used in certain embodiments to detect the reflected pulses.

Amplifier 135, which may be a transimpedance amplifier (TIA) in certain embodiments, may amplify each of the detected RZ pulses, and an electronic filter 140 may be used to remove or reduce the electronic domain or noise from each of the detected RZ pulses. A computing system 145 may then process each of the amplified RZ pulses, each of the amplified RZ pulse sequence having a unique pattern, to determine the distance between the source (e.g., laser diodes 110) and object 150. To make such a determination, computing system 145 uses a reference pattern that may also be generated by pattern generator 105 at the time the patterns were generated for each of the RZ pulses. Commercial-off-the-self communication bit-error-rate-tester (BERT) may also be used for pattern search data processing in some embodiments.

Figure 2:
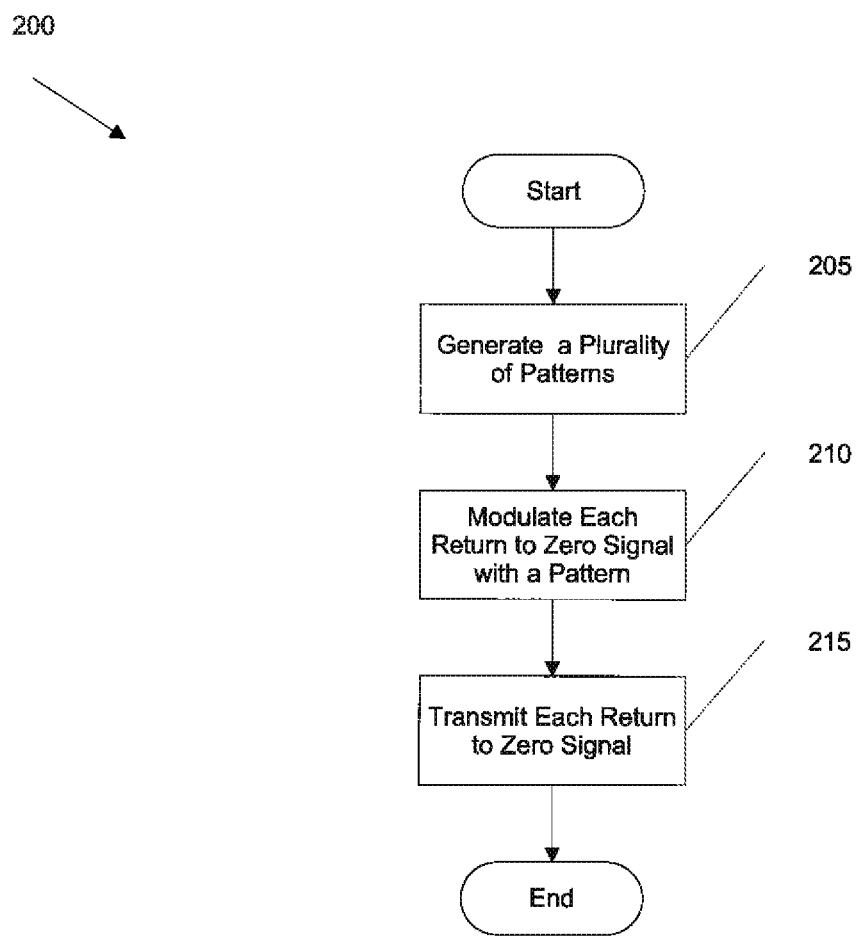
FIG. 2 is a flowchart illustrating a method for transmitting RZ pulses, according to an embodiment of the present invention.

FIG. 2 is a flowchart illustrating a method 200 for transmitting return to zero pulses, according to an embodiment of the present invention. The process of method 200 of FIG. 2 may be executed by, for example, the components illustrated in FIG. 1 or the computing system shown in FIG. 5. The method includes generating a plurality of patterns to be associated with a RZ signal at 205. At 210, each of the RZ signals is modulated with a unique pattern to identify each of the RZ signals. At 215, each RZ signal is transmitted to different locations on the object. In this embodiment, each of the RZ signals may be transmitted simultaneously to different locations on the object in certain embodiments, a scanner may be used to direct each of the RZ signals and transmit each of the RZ signals to different locations on the object.

Figure 3:
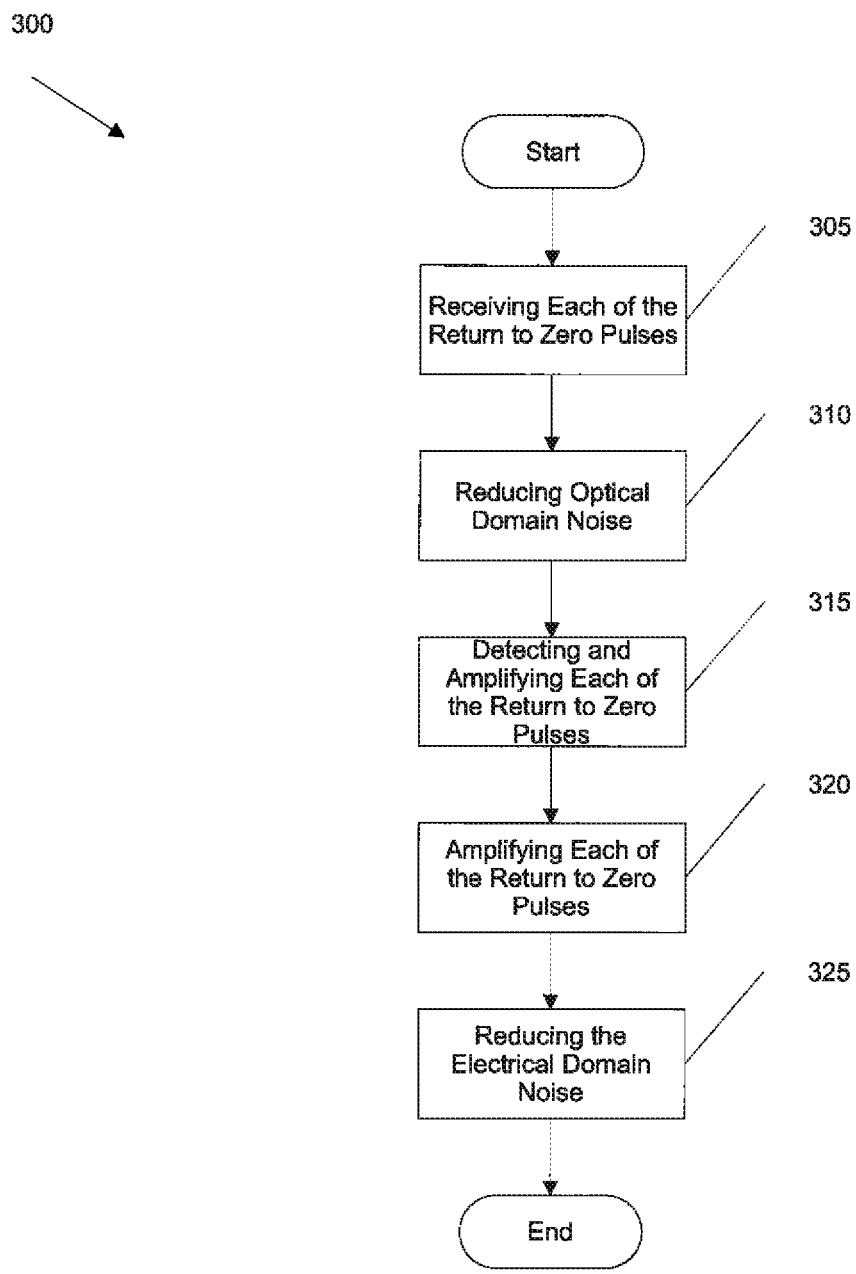
FIG. 3 is a flowchart illustrating a method for receiving the RZ pulses, according to an embodiment of the present invention.

FIG. 3 is a flowchart illustrating a method 300 for receiving the RZ pulses, according to an embodiment of the present invention. The process of method 300 of FIG. 3 may be executed by, for example, the components illustrated in FIG. 1 or the computing system shown in FIG. 5. The method includes receiving each of the RZ pulses at 305, and reducing any optical domain noise in each of the return to RZ pulses at 310. At 315, each of the received RZ pulses is detected and amplified. At 320, the electronic domain noise in each of the amplified RZ pulses is reduced and transmitted to a computing system at 325.

Figure 4:
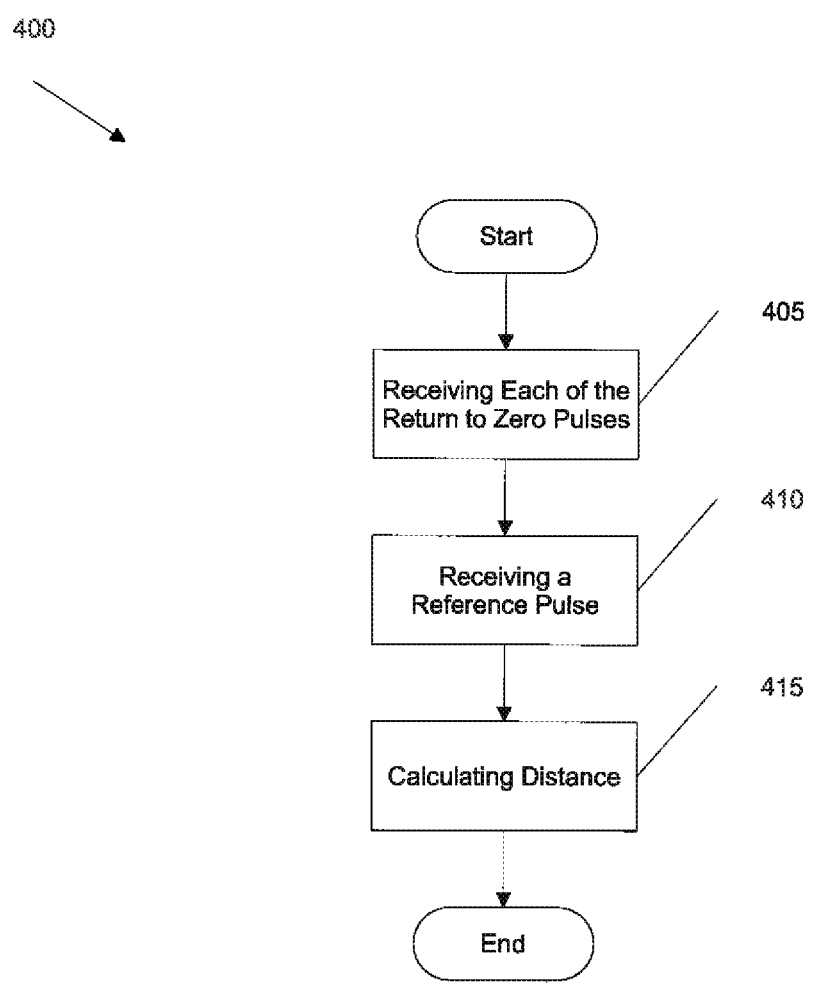
FIG. 4 is a flowchart illustrating a method for computing the distance between the source and the object, according to an embodiment of the present invention.

FIG. 4 is a flowchart illustrating a method 400 for computing the distance between the source and the object, according to an embodiment of the present invention. The process of method 400 of FIG. 4 may be executed by, for example, the components illustrated in FIG. 1 or the computing system shown in FIG. 5. The method includes receiving each of the RZ pulses at 405 and receiving a reference pattern to identify each of the RZ pulses based on the unique pattern associated with each of the RZ pulses at 410. A distance between the source and the object is calculated based on the time of travel from the source to the object and back from the object to the receiver (or source) at 415.

The method steps shown in FIGS. 2-4 may be performed, in part, by a computer program, encoding instructions for a nonlinear adaptive processor to cause at least the methods described in FIGS. 2-4 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the method described in FIGS. 2-4, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Figure 5:
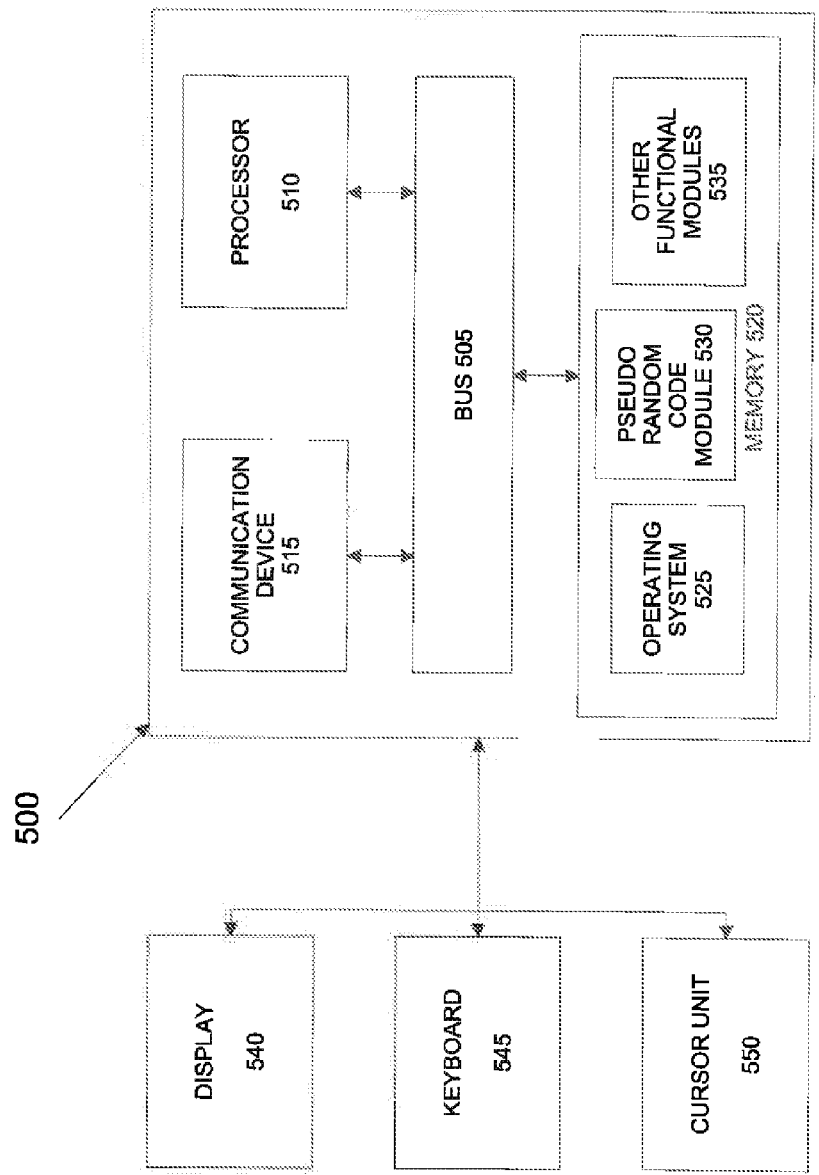
FIG. 5 illustrates a block diagram of a computing system for 3D imaging, according to an embodiment of the present invention.

FIG. 5 illustrates a block diagram of a computing system 500 for 3D imaging, according to an embodiment of the present invention. System 500 may include a bus 505 or other communication mechanism that can communicate information and a processor 510, coupled to bus 505, that can process information. Processor 510 can be any type of general or specific purpose processor. System 500 may also include memory 520 that can store information and instructions to be executed by processor 510. Memory 520 can be comprised of any combination of random access memory ("RAM"), read only memory ("ROM"), static storage such as a magnetic or optical disk, or any other type of computer readable medium. System 500 may also include a communication device 515, such as a network interface card, that may provide access to a network.

The computer readable medium may be any available media that can be accessed by processor 510. The computer readable medium may include both volatile and nonvolatile medium, removable and non-removable media, and communication media. The communication media may include computer readable instructions, data structures, program modules, or other data and may include any information delivery media.

Processor 510 can also be coupled via bus 505 to a display 540, such as a Liquid Crystal Display ("LCD"). Display 540 may display information to the user, such as the distance between the source and the object. A keyboard 545 and a cursor control unit 550, such as a computer mouse, may also be coupled to bus 505 to enable the user to interface with system 500.

According to one embodiment, memory 520 may store software modules that may provide functionality when executed by processor 510. The modules can include an operating system 525 and an enhanced pseudo random code module 530, as well as other functional modules 535. Operating system 525 may provide operating system functionality for system 500. Because system 500 may be part of a larger system, system 500 may include one or more additional functional modules 535 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One or more embodiments of the present invention pertain to determining the distance between a source and an object. Certain embodiments may include generating a plurality of patterns used to identify each of the RZ pulses that are simultaneously transmitted to the object. The distance between the object and the source may be calculated based on the time of travel for the RZ pulses.

It will be readily understood that the components of the invention, as generally described and illustrated in the figures herein, may be arranged and designed in a wide variety of different configurations. Thus, the disclosure is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A space based low power high resolution 3D imaging docking lidar system using resolution-enhanced pseudo-noise coding apparatus, comprising:
   an array of laser diodes including non-linear adaptive processor means for generating a plurality of unique patterns to be associated with a return to zero (RZ) signal, each laser diode configured to transmit said return to zero (RZ) signal to different locations simultaneously on a reflective moveable or non-movable object which reflects pulses;

a photo detector receiver for receiving each reflected RZ pulse from different locations on said object configured to receive each of the transmitted return to zero signals, identifying said reflective object, wherein each of the return to zero signals comprises a unique, pattern to distinguish between itself and the other simultaneously transmitted return to zero signals.

2. The apparatus of claim 1, further comprising:
a pattern generator configured to generate a plurality of unique patterns and drive the array of layer diodes, such that each of the laser diodes simultaneously transmits the return to zero signal to different locations on the object.

3. The apparatus of claim 1, further comprising:
a scanner configured to direct each of the return to zero signals and transmit each of the return to zero signals to different locations on the object.

4. The apparatus of claim 1, further comprising:
an optical filter configured to reduce optical domain noise in each received return to zero signal.

5. The apparatus of claim 1, further comprising:
an array of detectors configured to detect each received return to zero signal.

6. The apparatus of claim 1, further comprising:
an amplifier configured to amplify each detected return to zero signal.

7. The apparatus of claim 6, further comprising:
an electronic filter configured to reduce electronic domain noise in each amplified return to zero signal.

8. The apparatus of claim 1, further comprising:
a pattern generator configured to generate reference patterns to identify each of the return to zero signals based on the unique pattern included in each of the return to zero signals.

9. A method for using a space based low power high resolution 3D imaging docking lidar system using resolution-enhanced pseudo-noise coding for recognizing an object comprising:

transmitting, by each of a plurality of non-linear adaptive processor controlled laser diodes, a return to zero signal to different locations simultaneously on an object; and receiving, by a photo detector receiver, each of the transmitted return to zero signals, identifying said reflective object, wherein each of the return to zero signals comprises a unique pattern to distinguish between itself and the other transmitted return to zero signals.

10. The method of claim 9, further comprising:
generating, by a pattern generator, a plurality of unique patterns; and
driving, by the pattern generator, each of the laser diodes such that each of the laser diodes simultaneously transmits the return to zero signal to different locations on the object.

11. The method of claim 9, further comprising:
scanning, by a scanner, each of the return to zero signals; and
transmitting, by each of the plurality of laser diodes, each of the return to zero signals to different locations on the object.

12. The method of claim 9, further comprising:
reducing, by an optical filter, optical domain noise in each received return to zero signal.

13. The method of claim 9, further comprising:
detecting, by an array of detectors, each received return to zero signal.

14. The method of claim 9, further comprising:
amplifying, by an amplifier, each detected return to zero signal.

15. The method of claim 14, further comprising:
reducing, by an electronic filter, electronic domain noise in each amplified return to zero signal.

16. The method of claim 9, further comprising:
generating, by a pattern generator, a plurality of reference patterns to identify each of the return to zero signals based on the unique pattern included in each of the return to zero signals.

* * * * *